United States Patent [19]
Pearce et al.

[11] Patent Number: 4,991,671
[45] Date of Patent: Feb. 12, 1991

[54] MEANS FOR MOUNTING A ROLLER CUTTER ON A DRILL BIT

[75] Inventors: David E. Pearce; James C. Walter, both of Houston, Tex.

[73] Assignee: Camco International Inc., Houston, Tex.

[21] Appl. No.: 492,789

[22] Filed: Mar. 13, 1990

[51] Int. Cl.⁵ .............................................. E21B 10/20
[52] U.S. Cl. ........................................ 175/369; 384/96
[58] Field of Search ....................... 175/368, 369, 371; 384/92, 95, 96

[56] References Cited

U.S. PATENT DOCUMENTS

| | | | |
|---|---|---|---|
| 959,540 | 5/1910 | Hughes | 175/368 |
| 1,010,144 | 11/1911 | Hughes | 175/368 |
| 1,890,887 | 12/1932 | Reed | 175/368 |
| 2,490,151 | 12/1949 | Noble et al. | 384/96 |
| 2,513,634 | 7/1950 | Francis | 175/372 |
| 3,971,600 | 7/1976 | Murdoch et al. | 384/93 |
| 4,236,764 | 12/1980 | Galle | 175/369 |
| 4,538,928 | 9/1985 | Muma | 384/96 |
| 4,911,255 | 3/1990 | Pearce | 384/96 X |

OTHER PUBLICATIONS

Reed Tool Company Drawing No. D-139918 dated 1-11-88 for "Lug, Jet F".
Reed Tool Company Drawing No. D-140424 dated 11-17-88 for "Lug, Jet F".

*Primary Examiner*—Stephen J. Novosad
*Assistant Examiner*—David J. Bagnell
*Attorney, Agent, or Firm*—Dodge Bush & Moseley

[57] ABSTRACT

A rotary drill bit (10) having a roller cutter (28) retained on a journal (24) by an externally threaded retainer ring (52) mounted within an annular groove (48) in the journal (24). The radii (R1, R2) formed at the inner and outer corners of the groove (48) are designed by suitable formulas to provide adequate strength for the journal (24) including the flange (50) adjacent the groove (48).

10 Claims, 2 Drawing Sheets

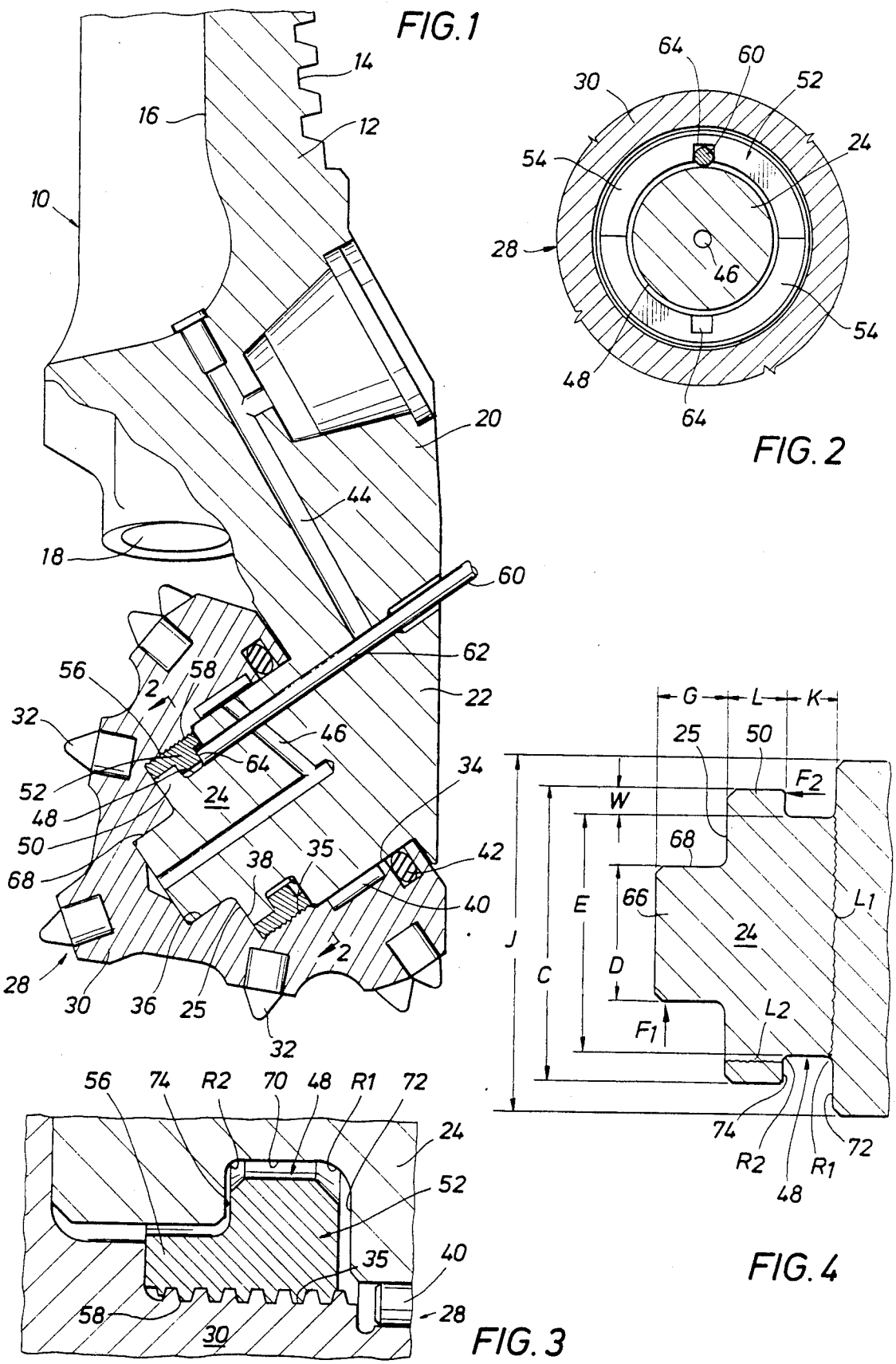

1

MEANS FOR MOUNTING A ROLLER CUTTER ON A DRILL BIT

BACKGROUND OF THE INVENTION

This invention relates to means for mounting a roller cutter on a drill bit for rotation, and more particularly to such means including a drill bit journal and a threaded retainer ring secured to the roller cutter received within an annular groove on the journal for retaining the roller cutter on the journal.

Heretofore, such as illustrated in U.S. Pat. No. 3,971,600 dated July 27, 1976, threaded retainer rings have been utilized for retaining roller cutters on journals of an earth boring drill bit. The retainer ring has a body of a generally rectangular or L-shaped cross section and fits within an annular groove on the journal for threading onto internal screw threads of the roller cutter for rotation with the roller cutter about the journal.

A possible source of journal failure may result from a stress concentration at the inner corner of the groove where cyclic bending stresses cause fatigue cracking that results in fracture across the entire diameter of the groove. This bending moment results from the cutter acting against the extending end of the journal thereby providing maximum bending stress at the inner corner where a stress concentration occurs.

A flange is formed on the journal outwardly of the annular groove and the thickness of the flange has to be sufficient to resist the thrust or axial loading against the flange resulting from contact with the retainer ring. Another stress concentration usually occurs at the outer corner of the groove adjacent the flange and failure of the flange beginning at this corner may occur under prolonged periods of use or under particularly high loading unless an adequate thickness flange is provided.

The stress concentration occurring at the corners may be reduced upon an increase in the size of the radii forming the corners. Thus, the design of the radii for the corners of the groove receiving a threaded retainer ring is important in providing a journal design adequate to withstand prolonged periods of use with roller cutters under adverse high loading conditions exerted against the roller cutters, particularly when certain types of especially demanding applications are encountered. A further improvement in the performance of the journal may be realized by employing surface treatments such as carburizing, nitriding, selective case hardening or shot-peening which increase local yield strength of the journal material and impart a residual stress state which offsets the applied stresses during operation.

In addition, another source of failure involves the screw threads between the roller cutter and threaded retainer ring. An adequate screw thread engagement for a predetermined screw thread class or size must be provided by the threaded retainer ring to ensure adequate thread strength.

SUMMARY OF PRESENT INVENTION

This invention is directed to a drill bit having a journal with an annular groove receiving a threaded retainer ring for retaining a roller cutter on the journal. The roller cutter is threaded onto the threaded retainer ring which is normally of an L-shape or rectangular cross section and the ring rotates with the cutter and is cyclically loaded against the flange adjacent the groove. The threaded retainer ring is provided with a predetermined thread engagement area for the roller cutter in accordance with a formula established for a predetermined thread size. The retainer ring exerts a shear loading against the flange with maximum stress acting at the outer corner of the groove where a stress concentration occurs.

An important feature of this invention is directed to the groove design of the journal including particularly the radii of the groove corners. As a result of substantial testing of roller cutters retained on journals by threaded retainer rings and applying engineering principles to empirical values observed from failure and non-failure of various designs tested, certain relationships as exemplified by formulas were developed for the design of radii for the corners of the groove receiving the threaded retainer ring.

One relationship is defined to obtain a minimum radius for the outer corner of the groove adjacent the flange for a predetermined flange thickness and flange width. A change in the flange thickness or flange width results in a change of the minimal radius for the outer corner. Thus, a minimum radius for a predetermined flange thickness and flange width will be obtained in order to prevent or minimize possible failure of the flange. A suitable formula has been established for this relationship.

Another relationship is set forth to obtain a desired minimum radius for the inner corner of the groove remote from the flange for a given groove diameter or cross sectional area of the journal at the groove. A minimal radius for a specific groove diameter or cross sectional area of the journal is established by a formula based on the results of substantial testing to failure and nonfailure, and application of engineering principles to empirical values observed from such testing. The minimum radius for the inner corner changes in regard to certain dimensions, for example, such as the diameter of the journal and the diameter of the groove, which affect the level of stress concentration.

These geometric relationships are applicable for high-strength journal materials exhibiting certain minimum yield strengths in the corner radii regions, and which further exhibit certain minimum surface compression residual stresses. Lower strengths or residual compressive stresses than those indicated will increase the minimum radii required to achieve sufficient fracture resistance.

As a result of establishing the effect of certain associated dimensions on the required minimum dimensions for the radii of the corners of the groove receiving the threaded retaining ring for retaining the roller cutter on the journal, any failure of the journal from cracking of the flange at the outer corner of the groove, or transverse fracture or cracking of the journal at the inner corner of the groove is greatly minimized as a result of reducing stress concentrations at the corners of the groove.

It is an object of this invention to provide an improved means for mounting a roller cutter on a drill bit for rotation including a drill bit journal and a threaded retainer ring secured to the cutter received within an annular groove on the journal for retaining the roller cutter on the journal.

It is a further object of this invention to provide design geometry and material strength criteria including formulas for such a journal which includes the establishing of minimum radii for the corners of the annular groove on the journal required to minimize possible journal failures.

An additional object of the invention is the establishment of minimum requirements for thread engagement areas between the roller cutter and threaded retainer ring for a predetermined bit diameter.

Additional objects, features, and advantages of the invention will become more apparent from the following specification and drawings.

BRIEF DESCRIPTION OF THE DRAWINGS

FIG. 1 is a longitudinal sectional view of a portion of a roller cutter drill bit showing a roller cutter mounted on a journal for rotation and retained on the journal by a threaded retainer ring received within an annular groove on the journal;

FIG. 2 is a sectional view taken generally along line 2—2 of FIG. 1;

FIG. 3 is an enlarged fragment of FIG. 1 showing the retainer ring and groove;

FIG. 4 is an enlarged elevational view of the journal of FIG. 1 with the roller cutter and threaded retainer ring removed and illustrating certain dimensions of the journal;

DETAILED DESCRIPTION OF THE INVENTION

Figure 5:
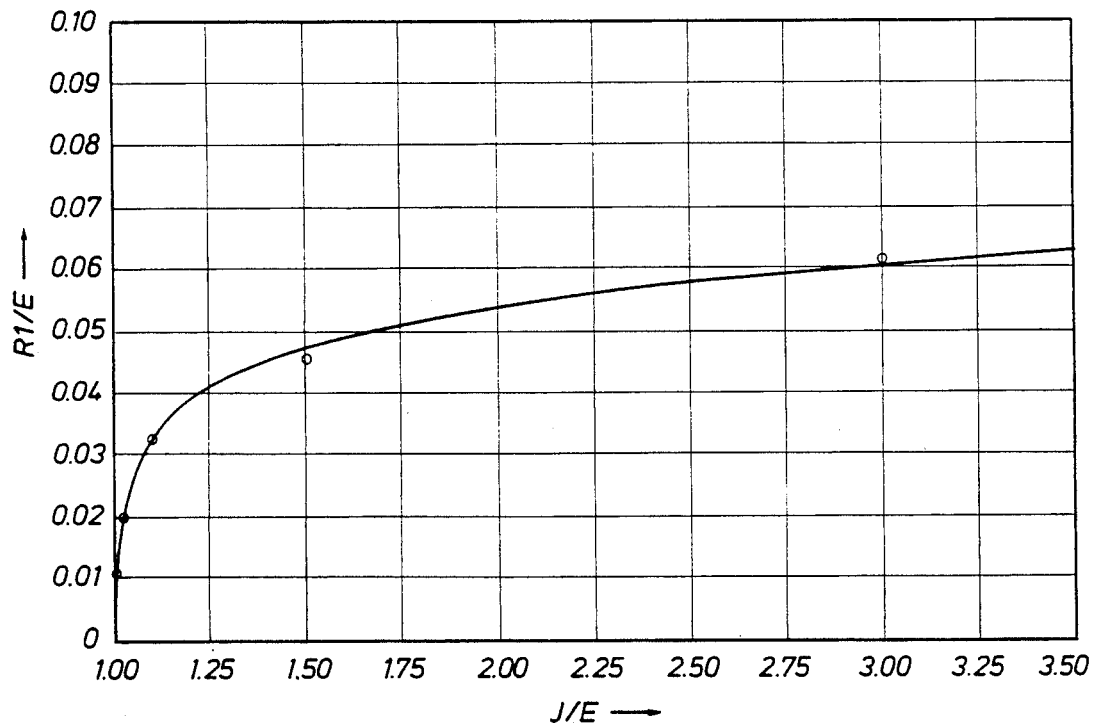
FIG. 5 is a graph illustrating the minimum radius recommended for the inner corner of the groove remote from the flange in regard to various predetermined groove diameters.

Referring now to the drawings for a better understanding of this invention, a rotary drill bit is shown partially at 10 at FIG. 1 including a body 12 having threads 14 at its upper end adapted to be connected to a drill string (not shown) for rotation and for supply of drilling fluid through bore 16 and opening 18 for discharge against the formation to be bored or cut by drill bit 10.

Drill bit 10 is a triple cone rotary drill bit and body 12 is formed of three contiguous legs or segments 20 welded together for forming body 12. Each leg 20 has a free extending end 22 with a generally cylindrical journal or spindle 24 extending outwardly from leg 22. An annular thrust bearing 25 is formed on the extending outer end of journal 24.

A roller cutter generally indicated at 28 has a conically shaped body 30 with cutting elements 32 projecting therefrom for engaging the formation to be cut. Cutter body 30 has a central bore 34 therein including an internally threaded portion 35 and a small diameter end bore portion 36. Central bore 34 defines an inner annular bearing area 38 in bearing contact with annular thrust bearing 25 on journal 24. A bushing 40 is mounted between journal 24 and roller cutter body 30.

A resilient seal 42 is mounted within an annular groove in body 3 and seals between journal 24 and roller cutter 28 to prevent detritus or other foreign matter from entering the bearing area. For lubricating the bearing areas, lubricant passages 44 and 46 provide lubricant from a suitable lubricant supply or reservoir.

For retaining roller cutter 28 onto journal 24, an annular groove 48 is provided about journal 24 and defines an adjacent flange 50. Mounted in groove 48 is a generally L-shaped retainer ring generally indicated at 52 composed of two generally identical half sections 54. The outer circumference or periphery of retainer ring 52 including an extension 56 has screw threads 58 thereon. Extension 56 provides a relatively large surface area for screw threads as may be desirable for certain sizes of roller cutters. In some instances it may be desirable to have retainer ring 52 of a rectangular cross section without having extension 56 thereon to form the so-called "L-shape".

For assembly of roller cutter 28 onto journal 24, half sections 54 of retainer ring 52 are positioned within groove 48 and then an assembly tool 60 is placed within a bore 62 to engage an opening 64 in one of the half sections 54 to hold ring 52 against rotation. Next, roller cutter 28 is threaded onto threads 58 for accurately positioning roller cutter 28 on journal 24. After assembly of roller cutter 28, tool 60 is removed from bore 62 and a suitable plug is placed in the end of bore 62 to prevent any lubricant loss.

Referring now to FIGS. 3–5 in which the present invention is particularly illustrated, reference is made first to FIG. 4 in which journal 24 is illustrated. Journal 24 has a small diameter cylindrical end portion 66 forming an annular bearing surface 68 which is normally surface hardened by a suitable hardening process. The internal small diameter end bore portion 36 of cutter 28 bears against bearing surface 68 and exerts a distributed bearing force against bearing surface 68 shown at F1.

Groove 48 has an annular bottom surface 70 and respective inner and outer surfaces 72, 74 extending perpendicularly to bottom surface 70. Surface 74 forms a shoulder for engaging the adjacent surface of threaded retainer ring 52. Ring 52 does not contact groove surface 72 and a minimum clearance is provided between groove surface 72 and ring 52. A radius R1 is formed at the juncture of surfaces 70 and 72 at the inner corner of groove 48. A radius R2 is formed at the juncture of surfaces 70 and 74 at the outer corner of groove 48. The diameter of groove 48 is shown at E and the width of groove 48 is shown at K. Flange 50 has a width shown at W, a thickness shown at L, and a diameter shown at C. The diameter of end portion 66 is shown at D and its length is shown at G.

A stress concentration occurs at the inner corner of groove 48 at R1 resulting from roller cutter 28 exerting a force shown at F1 against bearing surface 68 with a bending moment arm extending from bearing surface 68 to the corner formed at R1. Failure of journal 24 may occur along fracture line L1 under prolonged periods of use or under heavy overloads in use against very hard formations, and particularly if radius R1 is below a certain minimal value.

Another stress concentration occurs at the outer corner of groove 48 at R2 resulting from roller cutter 28 and retainer ring 52 secured thereto acting at F2 against outer surface 74 defining groove 48. Failure of flange 50 may occur along fracture line L2 under prolonged periods of use or under heavy overloads in use against very hard formations particularly if radius R2 is below a certain minimal value.

Another possible area of failure involves the screw threads between roller cutter 28 and retainer ring 52 which are formed in accordance with thread class 2A of the American Standard For Unified Screw Threads for fine thread series UNF. Engagement of the screw threads is determined in accordance with appendix C of ANSI standards for Unified Inch Screw Threads. The following formula has been found to be satisfactory for determining the minimum length of thread engagement for a given bit diameter required to secure cutter 28 on journal 24 under anticipated operational load conditions, provided the thread materials have a yield strength of 120,000 psi or greater:

$$Te \geq 0.04 \times BD - 0.115$$

where BD is the diameter of the bit in inches and Te is the length of the thread engagement in inches. For example, with a bit diameter (BD) of $8\frac{3}{4}$ inches the minimal thread engagement length (Te) would be 0.235 inch. Thus, ring 52 should be of a minimal height or width of 0.235 inch in order to provide adequate thread engagement between roller cutter 28 and retainer ring 52. For a $6\frac{1}{2}$ inch diameter bit the thread engagement width should be 0.145 inch and for a $12\frac{1}{4}$ inch diameter bit the thread engagement width should be a minimum of 0.375 inch. While ring 52 is preferably of an L-shape to provide an adequate thread area while maintaining a minimal groove width K, ring 52 may, if desired, be formed of a rectangular cross section which would require a groove width substantially the same as the width of ring 52. The forces acting against bearing surface 68 to cause a bending moment at radius R1 are shown diagramatically at F1 in FIG. 4. Additional forces F2 are also shown in FIG. 4 acting against surface 74 of flange 50 to cause a bending moment at radius R1. For the purposes of determining minimum radii R1 and R2, the following relationships are applicable to high-strength journal materials having minimum yield strengths of 250,000 psi in the regions adjacent to the radii, and extending to a depth of at least about equal to the values of R1 and R2.

A net surface compressive residual stress state of at least 30,000 psi is also presumed to be operative in these regions. Lower yield strength materials or lesser compressive residual stresses will require larger minimum radii sizes.

For determining the minimum radius R1 for the inner corner of groove 48, reference is made to the graph shown on FIG. 5 and the formula set forth as follows:

$$\frac{R1}{E} \geq a \ln \left[ \frac{\left(\frac{J}{E} - 1\right)}{b} \right]$$

where
J is the diameter of the journal bearing in inches
E is the diameter of the groove in inches
a is 0.0096 (a constant derived empirically from testing)
b is 0.0035 (a constant derived empirically from testing)
ln is the natural logarithm for base e.

For example, with a typical drill bit having a diameter of $8\frac{3}{4}$ inches, J is 2.185 inches, E is 1.581 inches, a is 0.0096 and b is 0.0035. Using the above formula, the minimum acceptable R1 is found by the following calculation:

$$R1 \geq a \ln \left[ \frac{\left(\frac{J}{E} - 1\right)}{b} \right] \times E$$

$$R1 \geq .0096 \ln \left[ \frac{\left(\frac{2.185}{1.581} - 1\right)}{.0035} \right] \times 1.581$$

$$R1 \geq .071 \text{ Inches}$$

As shown in FIG. 5, a curve has been plotted to determine a minimum R1 as a function of journal diameter J and groove diameter E. Selection of a design value for R1 should be made on or above the curve of FIG. 5 to reduce the stress concentration at R1 and thereby provide adequate resistance to fracture across the journal.

To illustrate the application of this criteria to the design of different bit sizes, minimum values of R1 from the curve of FIG. 5 are listed in Table 1 with typical dimensions from $6\frac{1}{2}$, $8\frac{3}{4}$, and $12\frac{1}{4}$ inch diameter bits.

TABLE 1

Minimum R1 Required For Typical Dimensions Of Various Bit Sizes
a = .0096   b = .0035

| Bit Diameter (inches) | $6\frac{1}{2}$ | $8\frac{3}{4}$ | $12\frac{1}{4}$ |
|---|---|---|---|
| Journal Diameter J (inches) | 1.600 | 2.185 | 2.750 |
| Groove Diameter E (inches) | 1.210 | 1.581 | 2.186 |
| Minimum Inner Corner Radius R1 (inches) | .053 | .071 | .090 |

Thus for a $6\frac{1}{2}$ inch diameter bit with journal diameter J of 1.600 inches and groove diameter E of 1.210 inches, a radius of 0.053 inch or larger would be required for the inner corner of groove 48 to avoid fracture. Likewise, for a $12\frac{1}{4}$ inch diameter bit with journal diameter J of 2.750 inches and groove diameter E of 2.186 inches, a radius of 0.090 inch or larger would be required.

Figure 6:
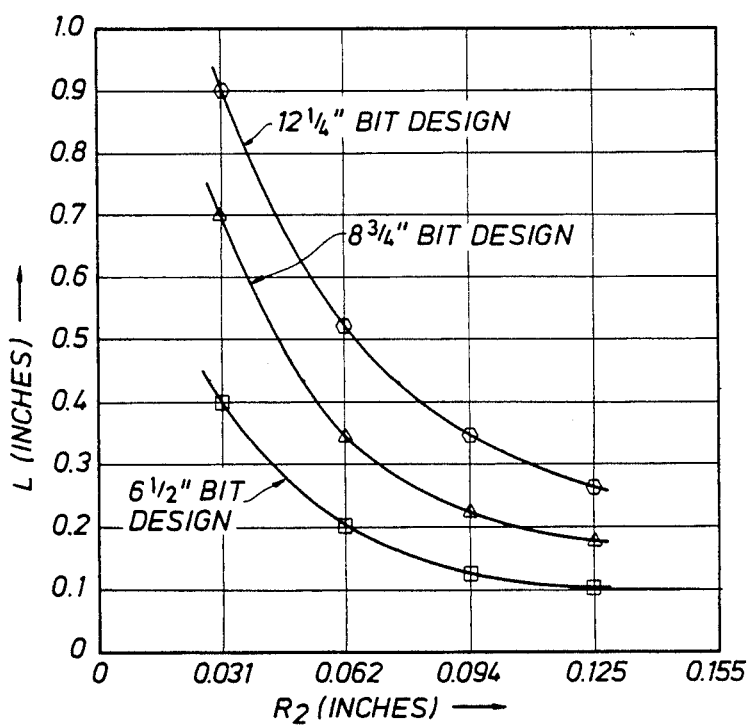
FIG. 6 is a graph representing the minimum radius recommended for the outer corner of the groove adjacent the flange for predetermined flange widths and thicknesses.

For determining the minimum radius R2 for the outer corner of groove 48, reference is made to the graph shown in FIG. 6 and the formula set forth below as follows:

$$L \geq \left(\frac{W^2}{R2}\right) \times c \text{ and}$$

$$R2 \geq \left(\frac{W^2}{L}\right) \times c \text{ where:}$$

L is the thickness of flange 50 in inches,
W is the width of flange 50 in inches, and
c is 0.60 (a constant derived empirically from testing)

For example, if the thickness L of flange 50 is 0.345 inch and the width W of flange 50 is 0.189 inch then the minimum R2 would be 0.062 inch. FIG. 6 shows three different curves each for a different diameter bit and illustrating a minimum R2 for specific flange thickness L and flange width W of a specific diameter bit. A value for R2 is selected on or above or to the right of the curve or line for a particular size bit having a given combination of flange thickness L and flange width W to provide an adequate radius for the outer corner at R2 in order to minimize the stress occurring at the outer corner. For example, a minimum radius of 0.062 inch would be required for (1) a flange thickness of 0.532 inch and width of 0.235 inch on a bit diameter of $12\frac{1}{4}$ inches, (2) a flange thickness of 0.345 inch and width of 0.189 inch on a bit diameter of 8¾ inches, and (3) a flange thickness of 0.195 inch and width of 0.142 inch on a bit diameter of 6½ inches. The following Table 2 sets forth the calculations for plotting the curves on FIG. 6 from the above formula.

TABLE 2

R2 Vs L.W
Bit Size (Inches)

| Minimum Acceptable Dimension | 6½ | | 8¾ | | 11¼ | |
|---|---|---|---|---|---|---|
| R2 | .062 | | .062 | | .062 | |
| L | .195 | | .345 | | .532 | |
| W | .142 | | .189 | | .235 | |
| | Minimum Acceptable | | Minimum Acceptable | | Minimum Acceptable | |
| | R2 | L | R2 | L | R2 | L |
| | .031 | .390 | .031 | .693 | .031 | 1.064 |
| | .062 | .195 | .062 | .345 | .062 | .532 |
| | .094 | .129 | .094 | .228 | .094 | .351 |
| | .125 | .097 | .125 | .171 | .125 | .264 |

From the above, a journal has been designed having a groove receiving a threaded retainer ring secured to a roller cutter for retaining the roller cutter on the journal for rotation. Stress concentrations at the corners of the retaining groove are minimized by providing minimum acceptable radii for adequate fracture resistance, as established by formulas derived from empirical data obtained by testing of various size journals to failure. Further, minimum acceptable thread engagement areas between the threaded retainer ring and roller cutter are obtained by a suitable formula. As a result of the design parameters obtained by such formulas, the possibility of journal or threaded retainer ring failures is greatly minimized.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In a triple cone drill bit having a bit body, a generally cylindrical journal extending from the bit body having an extending reduced diameter end portion forming a bearing surface and an annular groove defining an annular flange adjacent said reduced diameter end portion, a conically shaped roller cutter having a body with a central bore therein receiving said journal and including internal screw threads defining a portion of said central bore, and a retainer ring mounted within said annular groove and having external screw threads along its outer periphery in threaded engagement with said internal screw threads on said roller cutter for rotation with said roller cutter relative to said journal, said annular groove having a bottom surface and inner and outer side surfaces defining inner and outer corners at the junctures of said bottom surface with said inner and outer side surfaces;

an improved journal design for forming said annular groove including a predetermined minimum radius R1 for said inner corner being in accordance with the following formula for determining said predetermined minimum radius R1:

$$\frac{R1}{E} \geq a \ln \left[ \frac{\left(\frac{J}{E} - 1\right)}{b} \right]$$

where
J is the diameter of the journal bearing in inches,
E is the diameter of the groove in inches,
a is 0.0096 (a constant derived empirically from testing),
b is 0.0035 (a constant derived empirically from testing), and
ln is the natural logarithm for base e.

2. In a triple cone drill bit as set forth in claim 1;
said retainer ring being L-shaped and formed with screw threads about its outer periphery having a minimum width within the following formula:

$$Te \geq 0.04 \times BD - 0.115$$

where
BD is the diameter of the bit in inches; and
Te is the minimum width of the threaded engagement area on said retainer ring.

3. In a triple cone drill bit as set forth in claim 1; said retainer ring being constructed of two or more semicircular segments, each having an L-shaped cross section.

4. In a triple cone drill bit as set forth in claim 1; said journal being formed of a high strength material having a minimum yield strength of at least around 250,000 psi and a residual stress of at least around 30,000 psi.

5. In a triple cone drill bit having a bit body, a generally cylindrical journal extending from the bit body having an extending reduced diameter end portion forming a bearing surface and an annular groove defining an annular flange adjacent said reduced diameter end portion, a conically shaped roller cutter having a body with a central bore therein receiving said journal and including internal screw threads defining a portion of said central bore, and a retainer ring mounted within said annular groove and having external screw threads along its outer periphery in threaded engagement with said internal screw threads on said roller cutter for rotation with said roller cutter relative to said journal, said annular groove having a bottom surface and inner and outer side surfaces extending in a generally normal relation to said bottom surface, said groove defining inner and outer corners at the junctures of said bottom surface with said inner and outer side surfaces;

an improved journal and retainer ring design for maintaining said roller cutter on said journal including a retainer ring formed with screw threads about its outer periphery having a minimum width within the following formula:

$$te \geq 0.04 \times BD - 0.115$$

where
BD is the diameter of the bit in inches; and
Te is the minimum width of the threaded engagement area on the retainer ring;

said groove including a predetermined minimum radius for said inner corner in accord with a formula defining relationships among dimensions including the diameter of the groove, the width of the bearing surface, the thickness of the flange, the width of the flange, and the width of the groove.

6. In a triple cone drill bit as set forth in claim 5; said journal being formed of a high strength material having a minimum yield strength of at least around 250,000 psi and a residual stress of at least around 30,000 psi.

7. In an earth boring drill bit having a generally cylindrical journal extending from the bit body having an extending reduced diameter end portion forming a bearing surface and an annular groove defining an annular flange adjacent said reduced diameter end portion with the groove having inner and outer corners;

a conically shaped roller cutter having a body with a central bore therein receiving said journal and including screw threads defining a portion of said central bore;

a split retainer ring mounted within said annular groove and having external screw threads along its outer periphery in threaded engagement with said internal screw threads on said roller cutter for rotation with said roller cutter relative to said journal; said retainer ring formed with screw threads about its outer periphery and having a minimum threaded width in accord with the following formula:

$$Te \geq 0.04 \times BD - 0.115$$

where
BD is the diameter of the bit in inches, and
Te is the minimum threaded width of the threaded engagement area on the retainer ring;

said annular groove including a predetermined minimum radius R1 for said inner corner in accordance with the following formula:

$$\frac{R1}{E} \geq a \ln\left[\frac{\left(\frac{J}{E} - 1\right)}{b}\right]$$

where
J is the diameter of the journal bearing in inches,
E is the diameter of the groove in inches,
a is 0.0096 (a constant derived empirically from testing),
b is 0.0035 (a constant derived empirically from testing), and
ln is the natural logarithm for base e.

8. In a triple cone drill bit having a bit body, a generally cylindrical journal extending from the bit body having an extending reduced diameter end portion forming a bearing surface and an annular groove defining an annular flange adjacent said reduced diameter end portion, a conically shaped roller cutter having a body with a central bore therein receiving said journal and including internal screw threads defining a portion of said central bore, and a two piece split retainer ring mounted within said annular groove and having external screw threads along its outer periphery in threaded engagement with said internal screw threads on said roller cutter for rotation with said roller cutter relative to said journal, said annular groove having a bottom surface and parallel inner and outer side surfaces extending in a perpendicular relation to said bottom surface, said groove defining inner and outer corners at the junctures of said bottom surface with said inner and outer side surfaces;

an improved journal and retainer ring design for maintaining said roller cutter on said journal including a two piece split retainer ring formed with screw threads about its outer periphery and having a predetermined minimal thread engagement width for a predetermined thread size;

said annular groove including minimum predetermined radii for said inner and outer corners, the minimum radius R2 for said outer corner being in accordance with the following formula:

$$R2 \geq \left(\frac{W^2}{L}\right) \times b$$

where
L is the thickness of the flange,
W is the width of the flange, and
b is a constant equal to 0.6;

said groove including a predetermined minimum radius R1 for said inner corner being in accord with a formula defining a relationship among dimensions including the diameter of the groove, the width of the bearing surface, the thickness of the flange, the width of the flange, and the width of the groove.

9. In a triple cone drill bit as set forth in claim 8 wherein said inner corner is in accordance with the following formula for determining said predetermined minimum radius R1:

$$\frac{R1}{E} \geq a \ln\left[\frac{\left(\frac{J}{E} - 1\right)}{b}\right]$$

where
J is the diameter of the journal bearing in inches,
E is the diameter of the groove in inches,
a is 0.0096 (a constant derived empirically from testing),
b is 0.0035 (a constant derived empirically from testing), and
ln is the natural logarithm for base e.

10. In a triple cone drill bit as set forth in claim 9 wherein said retainer ring is L-shaped in cross section and formed with screw threads about its outer periphery having a minimum width in accord with the following formula:

$$Te \geq 0.04 \times BD - 0.115$$

where
BD is the diameter of the bit in inches, and Te is the minimum width of the threaded engagement area on said retainer ring.

* * * * *